July 11, 1950 R. J. C. ROQUET ET AL 2,515,058

PROCESS AND APPARATUS FOR REDUCING THE DISTORTION IN THE TRANSMISSION OF SIGNALS

Filed Oct. 3, 1946 2 Sheets-Sheet 1

INVENTORS
HONORÉ MARCEL BAYARD
RAYMOND JACQUES CHARLES ROQUET

BY Adams & Bush

ATTORNEYS

PROCESS AND APPARATUS FOR REDUCING THE DISTORTION IN THE TRANSMISSION OF SIGNALS
Filed Oct. 3, 1946 2 Sheets-Sheet 2

INVENTORS
HONORÉ MARCEL BAYARD
RAYMOND JACQUES CHARLES ROQUET
BY Adams & Bush
ATTORNEYS Patented July 11, 1950 2,515,058

UNITED STATES PATENT OFFICE 2,515,058

PROCESS AND APPARATUS FOR REDUCING THE DISTORTION IN THE TRANSMISSION OF SIGNALS

Raymond Jacques Charles Roquet, Meudon, and Honoré Marcel Bayard, Clamart, France Application October 3, 1946, Serial No. 700,852
In France June 1, 1945

Section 1, Public Law 690, August 8, 1946
Patent expires June 1, 1965

4 Claims. (Cl. 178—69)

This invention relates to telegraph transmission systems, and, in particular, to the correction of the distortion of signals transmitted over such systems.

According to the International Convention of 1931, of the International Consulting Committee for Telegraphy, the term "a channel of telegraph transmission" will be applied to an assembly of electric network units and of mechanical members comprising two terminal stations which are, respectively, transmitter and receiver, this assembly being such that when the transmitting terminal station has a signal modulation applied thereto, the receiving terminal station reproduces this signal modulation by means of a movable element or of an element taking its place, such as a relay armature or an electronic system suitably adjusted so as to produce abrupt changes at its output terminals in relation to the control signal applied at its input terminals, for example, or similar element. The case may occur that between the transmitting terminal station and the receiving terminal station, there is no other circuit element to be found than the line proper, energy sources, and networks, to the exclusion of any kind of movable element or similar element. In such a case, the telegraph transmission channel is here designated "simple."

If a movable element, or several such elements, is placed at an intermediate point between the transmitting terminal station and the receiving terminal station, and is connected in series between two parts of the line, the telegraph transmission channel is here designated "complex."

The part of such "complex" transmission channel comprised between the transmitting station and the first of these intermediate movable elements, is a "simple" transmission channel or transmission channel unit. In the same way, the part of such "complex" transmission channel comprised between two successive movable elements is a "simple" transmission channel or transmission unit.

In the same way, the part of such "complex" transmission channel comprised between the last of these intermediate movable elements and the receiving terminal station is a "simple" transmission channel or transmission unit. In these cases, the modulating member is separated from the receiving member only by electric network units, including lines and sources, but to the exclusion of every movable member or every system playing a similar role.

It is known that it is always desirable to reduce the rate of telegraph distortion of a transmission channel, simple or complex, in order to keep it below an allowable distortion rate for good operation of telegraph apparatus which is to carry out the reproduction of signals upon arrival.

Usually, the distortion rate of a simple channel is reduced by inserting in its circuit, correcting network units whose role is to modify the curve representing the current received in the transient state following a unit variation of the voltage supplied at the initial point of that channel, this curve being called the "transition curve," and to render it more favorable for transmission. The modification having been made only on the electric network units comprised between the modulator and the member restoring the signal modulation at the receiving end, the channel does not lose its character of being a simple channel. To put this method into practice, at the beginning of the simple channel, there is sent a perfect modulation signal, and there is received at the output end of the channel, a modulation signal more or less distorted, according to the degree of improvement which is applied to the transition curve.

This method presents the inconvenience that every improvement of the transition curve requires a more sensitive receiver, and, hence, a more delicate receiver, and performance is limited by interference troubles of different origins, particularly those which are due to duplexing, which is difficult to eliminate by filtering precisely because this would work against the desired improvement of the transition curve.

In our application, Ser. No. 593,164, filed May 11, 1945, now abandoned, for Process and Apparatus for the Reduction of the Characteristic Distortion Due to Transmission Lines, and our copending application Ser. No. 75,152, filed February 8, 1949, for Correcting Devices for Telegraph Signals, we have described another method for the reduction of the distortion of the modulation signals received, which may be applied simultaneously with or separately from the method which has been mentioned, and this method, described in application Ser. No. 593,164, consists in transmitting over a transmission line, not the theoretically perfect modulation which is usually transmitted and is desired at the receiver, but a signal modulation intentionally and appropriately distorted, which, after the distortion caused by the transmission line, assumes in reception, a form as close as possible to that of the perfect signal modulation desired. Such an arrangement permits of obtaining an improvement in the modulation signals received, which becomes better and better as the number of elements of signal modulation used is made greater, which elements may be termed "advance signals." The complicated apparatus which it requires is well compensated for by the improvement in reception, and is justified when a very considerable improvement in the modulation signals received is required.

The present invention has for its object the reduction of the rate of the characteristic distortion of the modulating signals received over transmission lines, and provides a solution which is more economical but less precise, the results obtained being, nevertheless, sufficient for certain requirements generally met in practice.

By this method, the receiver retains its sensitivity characteristics, which protects it from the principal inconvenience of the method based only on the improvement of the transition curve.

In order to simplify this description, it will be assumed that the transmission channel is free from interference and not disturbed. In this case, the distortion takes the name of "characteristic distortion."

The object of the present invention is to provide an arrangement adapted to cause the transmission apparatus to produce, as usual, the theoretically perfect telegraph signal modulation which it is desired to have delivered at the receiving station, and involves the insertion in series with the transmission line of a "simple" transmission channel unit which is here designated an "anti-distortion unit," and which applies to the telegraph signal modulation which passes through it a kind of distortion which is here designated "algebraic distortion" and is later herein defined. This "algebraic distortion" is added algebraically to the distortion produced by the transmission line and compensates for the latter. Hence, it requires the addition of a "simple" transmission channel suitably chosen, connected in series with the transmission line, so that the resultant transmission channel is necessarily "complex," the meaning of "complex channel" having been above defined.

A further object of the present invention is to provide a particular embodiment of the anti-distortion unit, characterized in that this element is constituted by the combination of two telegraph relays with a suitably designed Kirchoff network which is introduced between the two relays.

We make use of a quantity which we call an "index number" which is characteristic of modulation signals, i. e., any given train of signal elements, and which is entirely determined for a given instant of the transmission of the signal modulation by the particular train of signal elements preceding that instant.

Our invention will be understood from the following description and the accompanying drawings, wherein:

Figs. 1 to 6, inclusive, are curves which show, for certain limiting cases, the values of the delay of restitution operating ratio plotted as a function of the index number for two values of index number;

Figure 1:
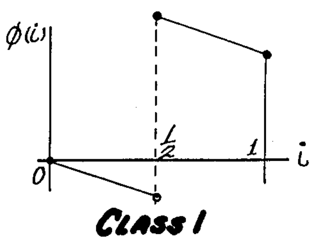
Figure 3:
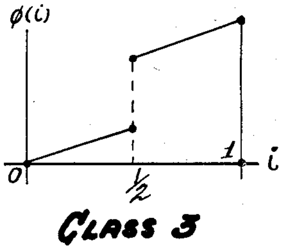
Figure 5:
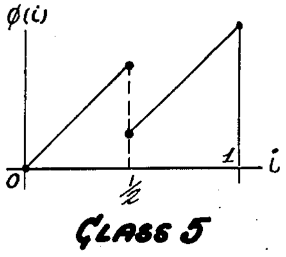
Figure 2:
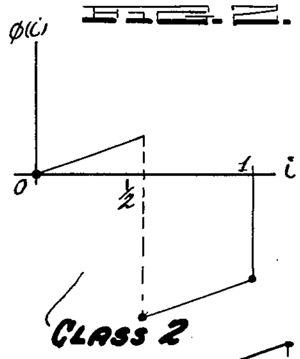
Figure 4:
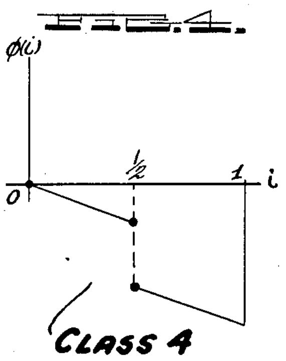
Figure 6:
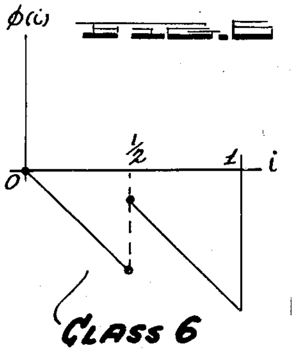

The anti-distortion element may be placed ahead of or following the transmission line, or between two parts of the line. In the first case, it confers upon the modulation signals traversing the line, a preliminary distortion which is then compensated by the distortion occurring in the transmission line. In the second case, it confers a compensating distortion upon the distorted modulation signals delivered from the transmission line. In the third case, it confers a compensating distortion upon the algebraic resultant the distortion of the two parts of the transmission line.

The anti-distortion element includes a Kirchoff network, having four or five terminals, and this network must necessarily be separated from the transmission line by a translating element, and it is, therefore, always placed between a transmitting relay and a receiving relay, whatever may be its position in relation to the transmission line.

By Kirchoff network is meant an electric network composed of resistances, inductances, or capacities, to the exclusion of rectifiers or unilaterally conducting cells, or electrolytic condensers, or generally of polarized elements.

The present invention is based upon the following important mathematical and experimental observations which we have made, and which apply to any type of transmitted telegraph modulation signal, whether univalent, bi-valent, or trivalent.

A bi-valent or two-valued telegraph signal modulation, for example, the elements of which all have the same duration $\tau$, may be defined by a series of terms:

$$a_0, a_1 \ldots a_h$$

which terms are equal to either −1 or to +1, according to any possible combination. By "restitution delay" there will be designated the time which elapses between an abrupt variation of the electromotive force or alternation, or reversal, effected by the modulator, and the operation corresponding to the movable member of the receiver, or the device which takes its place. It is known that the delay of restitution is not the same for all of the alternations or reversals which compose the signal modulation, and that, for a given transmission line, the lag in the restitution of an alternation at any instant $t_0+h\tau$, is entirely determined by the modulation signal passing at that instant; that is to say, is determined by the series of the terms given above.

A telegraph signal modulation is formed of abrupt changes of electromotive force applied to the input of a transmission channel. It will be supposed, to facilitate the explanation, that the signal modulation is bi-valent; that is to say, that the electromotive force can assume either one of two values which will be represented symbolically by the numbers $-1$ or $+1$. It will further be supposed that it is rhythmic and perfect; that is to say, that the instants of changing of the electromotive force, called characteristic instants, are mutually separated by an elementary time interval of duration $\tau$ or by an integral multiple of $\tau$.

The telegraph signal modulation which is delivered after a given instant taken as the origin, is completely defined by the series of numbers $a_0, a_1, a_2 \ldots a_h \ldots$ each one of which takes the value $+1$ or $-1$ according to the electromotive force applied in the circuit at the following instants respectively:

$$0, \tau, 2\tau \ldots n\tau$$

We have noted that the signal modulation delivered at an instant $h\,\tau$ arbitrarily chosen and represented by $a_0, a_1 \ldots a_h$, could be associated with a quantity or number $i$ which we have designated the "index number" and which is determined by the following series:

$$i = \frac{a_0}{2^h} + \frac{a_1}{2^{h-1}} + \ldots + \frac{a_{h-1}}{2} + a_h \qquad (1)$$

According to the manner in which the signal modulation develops in the course of time, such a number $i$ can then be assigned to each instant which is a multiple of the elementary interval $\tau$, (since this instant may occur or not at the change of electromotive force) and is determined entirely by the combination of signal elements which precede this instant.

These "index numbers" so defined have several properties, and, in particular, the following:

1. The index number of any modulation signal lies between $-2$ and $+2$.
2. Two index numbers which are different correspond to two different finite modulation signals.
3. To every modulation signal which terminates in an alternation or reversal, there corresponds an index number included between $-1$ and $+1$.
4. To every fractional number between $-2$ and $+2$, whose denominator is an integral power of 2, and whose enumerator is an odd integral number, there corresponds one single modulation signal, the number of elements of which is finite, and two others the number of elements of which is infinite.

The term "delay of restitution" is applied to the time which elapses between an abrupt variation of the electromotive force, designated an alternation or reversal, caused by the modulator, and the corresponding operation or movement of the tongue member of the register. It is known that the delay of restitution is not the same for all the alternations or reversals which constitute the modulation, and that, for a given transmission channel, the delay of restitution of an alternation or reversal depends on the modulation signal which precedes it.

This modulation signal, being entirely determined by the index number appertaining to this alternation or reversal, the delay of restitution is dependent on this index number.

If the ratio $$\phi = \frac{\rho}{\tau}$$

of the delay of restitution $\rho$ to the elementary signal duration $\tau$ be termed an "algebraic distortion," then that algebraic distortion is obviously a well defined function of the index number $i$:

$$\frac{\rho}{\tau} = \phi(i)$$

If the value of $\phi\ (i)$ is known for a given transmission line, in the interval from 0 to $+1$, there are, therefore, entirely defined the transmission properties of the line. This constitutes one of the important characteristics of the present invention.

Moreover, we have found that the algebraic distortion due to two telegraph transmission channels or lines, simple or complex, connected in series, is equal to the sum of the algebraic distortions respectively due to each of the lines considered separately, provided that the rate of ordinary distortion of the first line is sufficiently small, as of the order of 0.25, for example, a condition which is quite acceptable for the requirements of telegraph transmission engineers.

We have also found that if the transition curve of a given simple transmission channel is capable of being represented by the sum of several exponentials, the algebraic distortion of that line is the sum of terms each of which is, except for one coefficient, the algebraic distortion corresponding to a simple artificial line, the curve of the transition function of which would be capable of being represented except for one numerical factor, by a single constituent exponential.

Mathematical developments of this important property of algebraic distortion have made it clear to use that the distortion of a given transmission line may, in practice, be reduced to as small a value as may be desired, by providing, in series with its line, a simple transmission channel separated from that line by relays so as to be distinguished therefrom such that the individual inherent algebraic distortion should, within a certain approximation, be equal in absolute value and of opposite sign to the algebraic distortion due to the transmission line considered alone. This is an important feature of the present invention.

The simple compensating transmission channel or unit referred to above as an "anti-distortion unit" comprises a Kirchoff network formed of capacities, inductances and resistances. It may be determined by starting from given values of the properties of the line, whose characteristic distortion is to be reduced.

The index numbers and the algebraic distortion of a transmission line are measurable quantities, so that a curve showing the algebraic distortion as a function of the index numbers; that is, $\phi(i)$, may be traced empirically.

We have observed that the curve representing the algebraic distortion as a function of the index number, presents in general, a discontinuity of a certain magnitude for the value $i=\frac{1}{2}$; and discontinuities which are generally of smaller magnitude for the values $i=\frac{1}{4}$ and $i=\frac{3}{4}$. Then, for the set of values of $i$ equal to $\frac{1}{8}, \frac{3}{8}, \frac{5}{8}, \frac{7}{8}$, and so forth, the magnitude of these discontinuities generally and regularly decreases when passing from one set of values to another.

The algebraic distortion curve $\phi(i)$ then presents itself in reality under the form of a succession of points whose number is not limited, and which points are separated by spaces, certain of which are relatively great and others of which are infinitely small.

To trace empirically this curve representing algebraic distortion as a function of the index number, it is possible to employ the oscillogram of a received signal modulation, across which oscillogram the various delay intervals are measured and the index numbers are calculated. For this oscillographic test, it is advantageous to transmit a fixed phrase, the sequence of the index numbers of which would be known in advance and established in such manner as to be fairly complete in order that the curve constructed point by point, may be sufficiently dense.

The network of the anti-distortion element may be determined by the following method, in a simple case:

The algebraic distortion curve $\phi(i)$ of the given transmission line, is plotted without using an anti-distortion element. This curve so determined may have very different forms, but which, considering only the extreme limiting values and the one discontinuity for the index number $i=\frac{1}{2}$, may be divided into six different classes shown in Figs. 1–6.

It will be noted that the curves of classes II (Fig. 2), IV (Fig. 4), and VI (Fig. 6), have a slope opposite to that of the curves of class I (Fig. 1), class III (Fig. 3), and class V (Fig. 5), respectively.

If attention be paid only to the value of the algebraic distortion $\phi(1)$ and to the two values of $\phi(\frac{1}{2})$, the curve $\phi(i)$ is determined by two numbers which are $\phi(1)$ and the algebraic difference $\Delta\phi(\frac{1}{2})$ between the two values for $\phi(\frac{1}{2})$.

Therefore, if the curve $\phi(i)$ of the transmission line, the distortion of which is to be corrected, is a certain curve of class III (Fig. 3), it will be sufficient to determine the anti-distortion unit to be used in such manner that the curve $\phi(i)$ is that one of the curves of class IV (Fig. 4) which varies in an exactly opposite manner, at least in the vicinity of the values for $i$ of 1 and ½.

Now, if consideration be given only to networks formed either by two capacities and two resistances, or one capacity, one resistance and one inductance, inserted between two end relays, positioned on the respective sides of a network, an infinity of elements of simple transmission channels are obtained which present all the varieties of the curves $\phi(i)$ of the six groups I to VI of Figs. 1–6. For the purpose of simplification, it may be stated that these networks are complex networks of the second order. A complex network of the second order is a Kirchoff network having two branches. These branches may be, for example, the branch comprising $Z_1$ and $L_1$, and the branch comprising $Z_2$ and $L_2$ of the fourth order Kirchoff network of Fig. 13, which has four branches.

It is possible, either by calculation, by applying well known theories, or empirically, to determine the transfer impedance of a complex network of the second order which satisfies these requirements. This follows in particular from the theoretical ratios which exist between two constituent exponentials of the transient function and the two values of algebraic distortion $\phi(1)$ and $\Delta\phi(\frac{1}{2})$ on the one hand, and on the other hand, between these two exponentials and the simple algebraic elements of the transfer impedance.

Consequently, it is clear that a complex transmission line or channel constituted by a given line to which is added in series the simple transmission line or channel thus determined, possesses algebraic distortion whose magnitude is zero in the vicinity of the values for $i$ of 0, ½, and 1.

Figure 11:
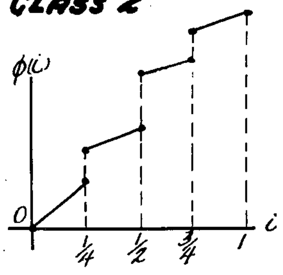
Fig. 11 is a curve which shows the values of the algebraic distortion (i. e. the ratio of the delay of restitution to the duration of the elementary signal), plotted as a function of the index number, for four values of index number, for a transmission channel whose transition curve is increasing.

Fig. 11 shows an example of the curve $\phi(i)$ made for a transmission channel whose transient curve is increasing. For purposes of simplicity, there are shown in Fig. 11 only the points corresponding to the five values of the index number $i$, for 0, ¼, ½, ¾, 1.

In drawing these curves, of Fig. 11, for the functions of the index numbers $i$, there has been arbitrarily chosen for the origin for the time of restitution, the point of time which corresponds to a zero value of the time of restitution for the zero value of the index number.

Figure 12:
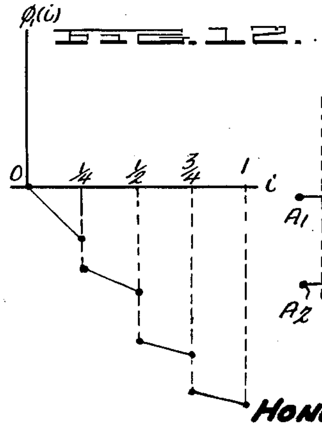
Fig. 12 is a curve which shows the values of the delay of restitution ratio of the anti-distortion unit itself, plotted as a function of the index number.

Figure 12 shows the function $\phi_1(i)$, that is, the algebraic distortion of the anti-distortion unit itself.

Figure 7:
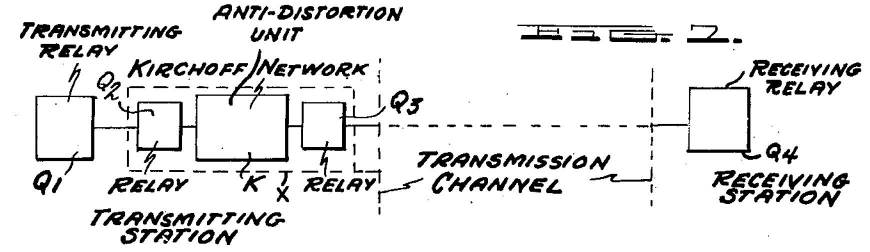
Fig. 7 is a block diagram of a system embodying the present invention, showing a transmitting channel connecting a transmitting station to a receiving station, and an anti-distortion unit inserted in series at the transmitting station ahead of the transmission channel.

Fig. 7 is a block diagram of an arrangement embodying the present invention, showing the transmitting channel connecting the transmitting relay at the transmitting station, and the receiving relay at the receiving station, and the anti-distortion unit X including its Kirchoff network K inserted in series at the transmitting station ahead of the transmission channel.

Figure 8:
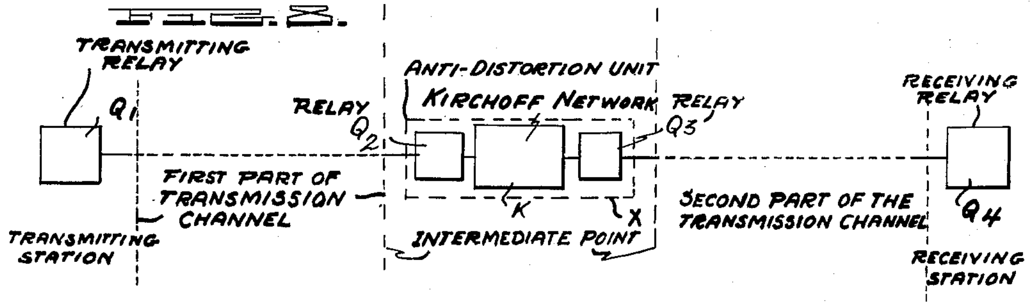
Fig. 8 is a block diagram similar to Fig. 7, but showing the anti-distortion unit inserted at an intermediate point in the transmission channel.

Fig. 8 is a block diagram similar to Fig. 7, but showing the anti-distortion unit X inserted at an intermediate point in the transmission line.

Figure 9:
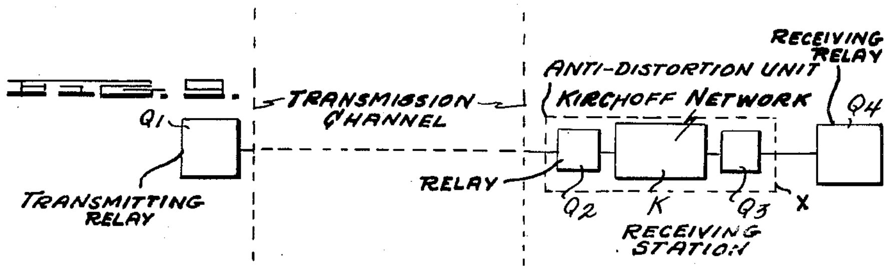
Fig. 9 is a block diagram similar to Fig. 7, but showing the anti-distortion unit inserted at the receiving station following the transmission channel.

Fig. 9 is a block diagram similar to Fig. 7, but showing the anti-distortion unit X inserted at the receiving station following the transmission line.

The anti-distortion unit X, as shown in Fig. 7, includes connected in series a relay Q2 connected to the input of the Kirchoff network K, and a relay Q3 connected to the output of the Kirchoff network K. The transmitting relay at the transmitting station is shown at Q1. The receiving relay at the receiving station is shown at Q4.

The anti-distortion unit X in Figs. 8 and 9 is the same as the anti-distortion unit X in Fig. 7.

Figure 10:
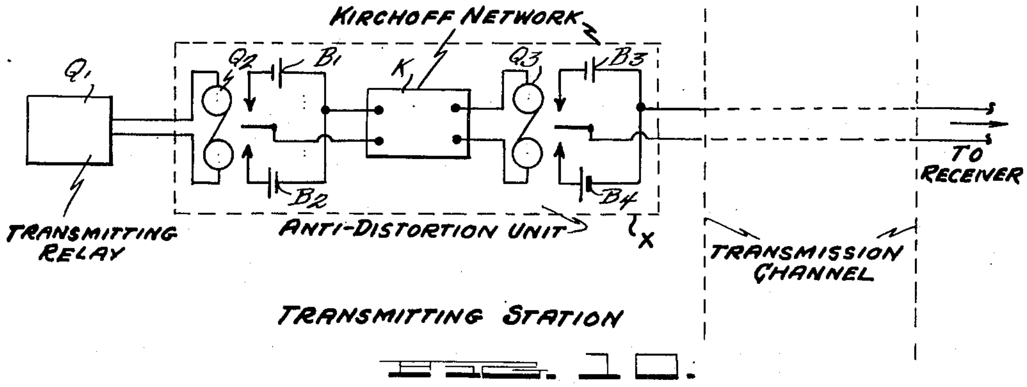
Fig. 10 is a circuit diagram showing in greater detail the elements of the anti-distortion unit of Fig. 7.

Fig. 10 shows in greater detail the elements of the anti-distortion unit X of Fig. 7. The input relay Q2 of the anti-distortion unit has its winding connected to the output of the transmitting relay Q1 of the transmitting station. The relay Q2 has two controlled contacts and two armature positions, and from batteries B1 and B2 can apply a voltage of either polarity to the input of the Kirchoff network unit K. The output relay Q3 of the anti-distortion unit has its winding connected to the output of the Kirchoff network K and has two controlled contacts and two armature positions, and from batteries B3 and B4 can apply signals of either polarity to the outgoing transmission channel.

As has been previously explained, the Kirchoff network is composed of resistances, inductances, or capacities, which are passive, to the exclusion of rectifiers or unilaterally conducting cells, or electrolytic condensers, or generally of polarized elements.

In the arrangement of Figs. 7 and 10, as used in the present invention, the relay Q2 is used for delivering a perfect telegraphic modulation to the Kirchoff network K. The relay Q3 is used for applying to the transmission channel, an intentionally distorted telegraph signal modulation. The two relays Q2 and Q3 are electrically connected to the Kirchoff network K and essentially cooperate therewith. These two relays Q2 and Q3 are needed to complete the system which includes the networks, to attain the desired results.

The anti-distortion network X of Figs. 8 and 9 operates in a manner similar to that explained for Figs. 7 and 10.

The two opposite sides of the Kirchoff network K are connected, respectively, to the relays Q2 and Q3 so that these relays are separating the network K from the transmitting station on the one hand and from the transmission channel on the other hand.

By "telegraph modulation" there is understood the successive movements of a movable index member between two stops (with the instants at which they occur), as the armature of a relay, for example, or to speak more generally, the abrupt variations of a parameter. The telegraph modulation, which occurs with a kinematic characteristic, and not operating electrically, can be considered to occur only for a mobile index member or a substitute therefor. This is the definition of the International Telegraph Consulting Committee.

If there was, for example, no relay Q2 in the system, it would not be possible to speak of a "perfect modulation signal" being applied to the Kirchoff network K, but, in this case, the sole effect of the Kirchoff network would be to control the transient regime in the transmission channel. If, for example, there was no relay Q3, the consequence would be a change of the transient regime in the transmission channel, but it would not be possible to speak of applying an "anti-distortion" modulation signal to the transmission channel.

The windings of relays Q2 and Q3 constitute an essential factor in the operation of Kirchoff network K. If the relay windings do not appreciably change the impedance of the network K, the Kirchoff network may be considered to be taken at the four terminals of the Kirchoff network K, as shown in Fig. 10. For greater precision, networks of five or more terminals may be employed.

The network K of the anti-distortion unit of Fig. 10 may conveniently be determined in the following manner:

The distortion can be compensated with the accuracy which is required, by using an "anti-distortion unit" designed in such a manner that its own algebraic distortion denoted by $\phi_1(i)$, satisfies the equation: $\phi(i)+\phi_1(i)$ must be constant where $i$ is the index number.

It can always be assumed that the delay of restitution is zero when the index number is zero because the time origin can be arbitarily chosen. So the condition which will be determining for the anti-distortion unit is:

$$\phi(i)+\phi_1(i)=0$$

Let "transition curve" or "transient curve" denote the transient response of the telegraph transmission channel when a steady state voltage is suddenly applied at the driving end, the value of the applied voltage being such that the steady state response is unity. It is well known that the "transient curve" can always be written:

$$f(t)=1-\sum_h \lambda_h e^{-\mu_h t}$$

the number of exponential terms being higher if the transmission network is more complicated. In this formula, the quantities $\lambda_1\lambda_2 \ldots \lambda_h$ are positives or negatives, or complex numbers, and $\mu_1\mu_2 \ldots \mu_h$ are real or complex numbers always with positive real parts.

For example, assume the transmission network of the antidistortion unit is such that a function like $f(t)$ with only four all real exponential terms is necessary to give a sufficiently accurate representation of the transient curve. In this case, the equation can be written:

$$f(t)=f_1(t)+f_2(t)+f_3(t)+f_4(t)$$

where $$f_1(t)=\lambda_1-\lambda_1 e^{-\mu_1 t}$$
$$f_2(t)=\lambda_2-\lambda_2 e^{-\mu_2 t}$$
$$f_3(t)=\lambda_3-\lambda_3 e^{-\mu_3 t}$$
$$f_4(t)=\lambda_4-\lambda_4 e^{-\mu_4 t}$$

We have found that the algebraic distortion $\phi(i)$ can be written:

$$\phi(i)=\frac{\lambda_1 e^{-\mu_1 t_0}(1-e^{-\mu_1\tau})\sum_{n=2}^{n=N} a_n e^{-\mu_1 n\tau}+\lambda_2 e^{-\mu_2 t_0}(1-e^{-\mu_2\tau})\sum_{n=2}^{n=N} a_n e^{-\mu_2 n\tau}+\ldots}{\lambda_1\mu_1 e^{-\mu_1 t_0}(e^{-\mu_1\tau}-2)+\lambda_2\mu_2 e^{-\mu_2 t_0}(e^{-\mu_2\tau}-2)+\ldots}$$

where N is the integral number which limits the number of modulation elements to be considered. For instance, referring to Figs. 11 and 12, the number N is 3.

The point zero not being considered, Fig. 11 or 12 give seven points. For each of these seven points, there can be deduced the values of $a_2, a_3$, and $\phi(i)$, and so for each of these seven points, there can be written an equation as above. We can so manage with seven equations, where:

$$\lambda_1\lambda_2\lambda_3\lambda_4\mu_1\mu_2\mu_3\mu_4$$

constitute eight unknown quantities. Since it is obvious that $$\lambda_1+\lambda_2+\lambda_3+\lambda_4=1$$

and for $t=0$ it is identically true that $f(t)=0$, to compute eight unknown quantities there are available eight completely determined equations. The computation is difficult, but can be carried out.

When these eight coefficients are known, the function $f(t)$ is definitely determined and, hence, the network of the anti-distortion unit can be determined. For instance, it is well known that if the eight coefficients of the type of $\lambda$ and $\mu$ are real numbers, the network K can be constructed with four resistances and four inductances, arranged as shown in Fig. 13.

Figure 13:
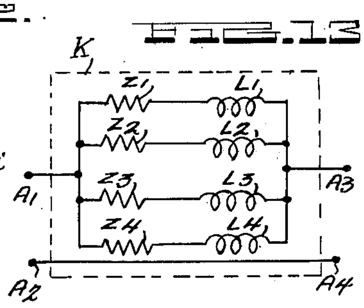
Fig. 13 shows a particular network constituting part of an anti-distortion unit.

In Fig. 13, Z1, Z2, Z3, Z4 are the resistances, L1, L2, L3, L4 are inductances, and A1, A2, A3, A4 are the input terminals and output terminals of the network.

Having estimated $\lambda_1\lambda_2\lambda_3\lambda_4\mu_1\mu_2\mu_3\mu_4$ as above indicated, the resistances and the inductances are determined on the basis of the relations:

$$R_1=\frac{1}{\lambda_1} R_2=\frac{1}{\lambda_2} R_3=\frac{1}{\lambda_3} R_4=\frac{1}{\lambda_4}$$

$$L_1=\frac{1}{\lambda_1\mu_1} L_2=\frac{1}{\lambda_2\mu_2} L_3=\frac{1}{\lambda_3\mu_3} L_4=\frac{1}{\lambda_4\mu_4}$$

The above calculation is not easy, but can be carried out, and it is theoretically possible, even for any number of values of the abscissa, and it is evident that it is possible to actually definitely determine the anti-distortion unit.

Finally, there have been chosen as an example, curves $f_1(t)$, $f_2(t)$, $f_3(t)$, $f_4(t)$ . . . to be of an exponential nature. We have observed that that was not indispensable and that it was possible to make the calculation of the curves without this requirement.

The method of calculation which has been described permits to determine the constituent elements of the anti-distortion network and to calculate its proper elements in detail. It is possible to employ a less precise determination by an empirical adjustment effected by selection of the channel for which it is desired to make compensation, for the characteristic distortion.

This method may obviously be generalized to obtain greater correction by considering, on the one hand, all of the different curves $\phi(i)$ when having regard to the values ¼, ½, ¾ and 1, of the index number, and, on the other hand, the constituent networks of complex anti-distortion elements of the third order; that is, the transfer impedance of which is of the third algebraic order. It is clear that the anti-distortion effect of the arrangement is all the greater, as the order of the network constituting the anti-distortion unit is increased.

It will be apparent to those skilled in the art that our invention is susceptible of modification to adapt the same to particular conditions, and all such modifications which are within the scope of the appended claims, we consider to be comprehended within the spirit of our invention.

We claim:

1. In a system for reducing the characteristic distortion of a telegraph line for transmitting signals comprising signal elements of uniform length, a transmitting station, a receiving station comprising a receiving relay, a transmitting line comprising a transmitting relay extending between said stations, an anti-distorting unit connected in series in the circuit between said receiving station and said transmitting station, said unit comprising connected in series a pair of relays and a Kirchoff network consisting only of ordinary passive resistances, inductances, and capacities connected in series between said relays, said unit being constituted in such manner that the ratio of the restitution delay which is individual to the duration of a said signal element applied thereto, presents, as a function of the number index of said modulation, a variation opposite to that which is presented by the ratio of the delay of restitution individual to the element of the line to be corrected to the duration of said signal element.

2. A system according to claim 1, said unit being inserted in series between said transmitting station and said line.

3. A system according to claim 1, said unit being inserted in series between said line and said receiving station.

4. A system according to claim 1, said unit being inserted in series in said transmission line intermediate its terminals.

RAYMOND JACQUES CHARLES ROQUET.
HONORÉ MARCEL BAYARD.

REFERENCES CITED

The following references are of record in the file of this patent:

UNITED STATES PATENTS

| Number | Name | Date |
|---|---|---|
| 1,717,116 | Milnor | June 11, 1929 |
| 1,843,226 | Herbig | Feb. 2, 1932 |
| 1,901,318 | Milnor | Mar. 14, 1933 |
| 1,961,334 | Burton | June 5, 1934 |
| 1,967,183 | Cannon | July 17, 1934 |
| 2,216,820 | Lewis | Oct. 8, 1940 |

Certificate of Correction

Patent No. 2,515,058 July 11, 1950

RAYMOND JACQUES CHARLES ROQUET ET AL.

It is hereby certified that error appears in the above numbered patent requiring correction as follows:

In the grant, lines 1 and 2, for "Raymond Jacques Charles Roquet, of Meudon, and Honoré Marcel Bayard, of Clamart, France" read *Raymond Jacques Charles Roquet, of Clamart, and Honoré Marcel Bayard, of Meudon, France*; in the heading to the printed specification, lines 5 and 6, for "Raymond Jacques Charles Roquet, Meudon, and Honoré Marcel Bayard, Clamart, France" read *Raymond Jacques Charles Roquet, Clamart, and Honoré Marcel Bayard, Meudon, France*; columns 9 and 10, line 24, for that portion of the denominator of the fraction reading "$(e^{-\mu_1\tau}{}_{-2})$" read $(e^{-\mu_1\tau}-2)$; same line, for "$(e^{-\mu_2\tau}{}_{-2})$" read $(e^{-\mu_2\tau}-2)$; column 10, lines 60 to 64, inclusive, for "$R_1=\frac{1}{\lambda_1}R_2=\frac{1}{\lambda_2}R_3=\frac{1}{\lambda_3}R_4=\frac{1}{\lambda_4}$ $L_1=\frac{1}{\lambda_1\mu_1}L_2=\frac{1}{\lambda_2\mu_2}L_3=\frac{1}{\lambda_3\mu_3}L_4=\frac{1}{\lambda_4\mu_4}$" read $R_1=\frac{1}{\lambda_1}\quad R_2=\frac{1}{\lambda_2}\quad R_3=\frac{1}{\lambda_3}\quad R_4=\frac{1}{\lambda_4}$ $L_1=\frac{1}{\lambda_1\mu_1}\quad L_2=\frac{1}{\lambda_2\mu_2}\quad L_3=\frac{1}{\lambda_3\mu_3}\quad L_4=\frac{1}{\lambda_4\mu_4}$ and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*